United States Patent
Uchida et al.

(10) Patent No.: US 9,120,184 B2
(45) Date of Patent: Sep. 1, 2015

(54) METHOD AND APPARATUS FOR MANUFACTURING VEHICLE POWER TRANSMISSION DEVICE

(75) Inventors: Keisuke Uchida, Nagoya (JP); Shingo Iwatani, Nisshin (JP); Katsunori Suzuki, Iwata (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/112,363

(22) PCT Filed: Apr. 18, 2011

(86) PCT No.: PCT/JP2011/059491
§ 371 (c)(1),
(2), (4) Date: Oct. 17, 2013

(87) PCT Pub. No.: WO2012/143986
PCT Pub. Date: Oct. 26, 2012

(65) Prior Publication Data
US 2014/0042208 A1    Feb. 13, 2014

(51) Int. Cl.
*B23K 26/28* (2014.01)
*B23K 31/02* (2006.01)
(Continued)

(52) U.S. Cl.
CPC ............ *B23K 31/02* (2013.01); *B23K 26/0823* (2013.01); *B23K 26/203* (2013.01); *B23K 26/24* (2013.01); *B23K 26/285* (2013.01); *B23K 26/3206* (2013.01); *B23K 31/125* (2013.01); *F16H 48/38* (2013.01); *G01M 13/021* (2013.01); *B23K 2201/006* (2013.01); *B23K 2201/008* (2013.01); *B23K 2203/04* (2013.01); *F16H 2048/382* (2013.01); *F16H 2048/385* (2013.01)

(58) Field of Classification Search
CPC ................... B23K 2201/04; B23K 2201/006; B23K 2201/008; B23K 26/265; B23K 26/28; B23K 26/285; B23K 26/03; B23K 26/032; B23K 31/125
USPC .................................................. 219/121.64
See application file for complete search history.

(56) References Cited

U.S. PATENT DOCUMENTS 4,800,250 A * 1/1989 Watanabe et al. ........ 219/121.63
7,322,454 B2 * 1/2008 Sato et al. .................... 192/3.29
(Continued)

FOREIGN PATENT DOCUMENTS

JP    07054961 A  *  2/1995
JP    11-151587 H     6/1999
(Continued)

*Primary Examiner* — Dana Ross
*Assistant Examiner* — Kuangyue Chen
(74) *Attorney, Agent, or Firm* — Kenyon & Kenyon LLP

(57) ABSTRACT

A method for manufacturing a vehicle power transmission device having a case and a ring gear fitted to the outer peripheral surface of the case to transmit drive power from a drive source. The method includes: a welding step in which an annular flange is provided on the case or the ring gear and butt welding is performed by lapping a weld bead along the contact portion of one side surface of the annular flange and the case or the ring gear; a measurement step in which the outline of the other side surface of the annular flange placed in close proximity to the one side surface are measured; and an evaluation step in which a weld condition is evaluated based on part of the outline, which is determined in the measurement step, of a portion corresponding to the lapping portion of the weld bead.

5 Claims, 11 Drawing Sheets

(51) Int. Cl.
  *B23K 31/12* (2006.01)
  *F16H 48/38* (2012.01)
  *B23K 26/24* (2014.01)
  *B23K 26/08* (2014.01)
  *B23K 26/20* (2014.01)
  *B23K 26/32* (2014.01)
  *G01M 13/02* (2006.01)

(56) References Cited

U.S. PATENT DOCUMENTS

2001/0005708 A1  6/2001  Iwai et al.
2009/0215573 A1*  8/2009  Segawa et al. ............ 475/230
2010/0227727 A1  9/2010  Ishikawa et al.

FOREIGN PATENT DOCUMENTS

| JP | 2000-039308 A | | 2/2000 |
| JP | 2000-111530 A | | 4/2000 |
| JP | 2004-009068 A | | 1/2004 |
| JP | 2004-184350 A | | 7/2004 |
| JP | 2006-275536 A | | 10/2006 |
| JP | 2006 275536 A | * | 10/2006 |
| JP | 2006275536 A | * | 10/2006 |
| JP | 2010-131629 A | | 6/2010 |
| JP | 2010-174924 A | | 8/2010 |
| JP | 2010-180976 A | | 8/2010 |
| JP | 2010-203599 A | | 9/2010 |
| WO | 2010/086704 A | | 8/2010 |

* cited by examiner

FIG. 7

| | ×: No Lapping (Decrease in Strength) | ○: Appropriate Lapping | ×: Too Long Lapping (Weld Distortion Increased) |
|---|---|---|---|
| Weld Bead Schematic Diagram of Lapping Portion | Start ↑ End ↑ | Start End ↑ Start ↑ L1 | Start ↑ ↑ L2 |
| Profile of Flange End Portion | ← | ← L1 | ← L2 |

METHOD AND APPARATUS FOR MANUFACTURING VEHICLE POWER TRANSMISSION DEVICE

CROSS REFERENCE TO RELATED APPLICATION

This is a national phase application based on the PCT International Patent Application No. PCT/JP2011/059491 filed on Apr. 18, 2011, the entire contents of which are incorporated herein by reference.

TECHNICAL FIELD

The present invention relates to a method and apparatus for manufacturing a POWER transmission device for a vehicle to transmit drive power or driving force from a power source such as an engine to drive wheels.

BACKGROUND ART

A differential gear device including differential gears is one example of a power transmission device for a vehicle to transmit drive power or driving force from a power source such as an engine to drive wheels. As shown in FIG. 10, a differential gear device 300 includes a differential case 301 (hereinafter, also referred to simply as a "case"), side gears 314 and 315 and pinion gears 312 and 313 mounted inside the differential case 301, and a ring gear 302 fixedly attached on the outer peripheral surface of the differential case 301. An annular flange 310 is formed on the outer peripheral surface of the conventional differential case 301, and the ring gear 302 is fastened to this flange 310 with bolts.

However, to fasten the ring gear 302 to the flange 310 of the differential case 301 with bolts, it is necessary to form screw holes in the ring gear body, and to form bolt through holes in the flange 310 of the differential case 301. The bolts need to be fastened after the ring gear 302 is fitted on the differential case 301, and the fastening torque of each bolt 311 need to be inspected. The large number of steps in these machining, assembling, and inspection processes was the cause of increase in cost of the vehicle power transmission devices.

The differential case 301 is conventionally made of spherical graphite cast iron, as casting allows formation of complex shapes, while the ring gear 302 is made by machining or forging from chromium molybdenum steel or the like as it is a component that requires high strength. Therefore, in welding the differential case 301 and the ring gear 302 to securely join them together, there was a problem of high cracking tendency in weld portions as these two parts are made of different materials.

The ring gear 302, which is an annular component, needs to be welded all around, with the start and finish ends of the weld bead being lapped, and this lapping portion of the weld bead is particularly prone to cracking as it is subjected to heat twice and suffers larger thermal contraction than other parts.

Patent Document 1 discloses a method of inspecting weld portions for cracks, wherein a portion of the weld portion that undergoes melting and solidifying processes or a portion near a heat-affected zone is irradiated with a laser beam, and the strain amount is dynamically measured based on changes in a speckle pattern, to detect cracks in the weld portion from changes with time in the dynamic strain amount. With this method, the strain on the surface of the weld portion is measured in a non-contact manner to detect high-temperature cracking in the weld portion, which is indicated by an interrupted portion of a strain curve that represents changes with time in the strain amount.

Patent Document 2 discloses a deformation monitoring device for welded structures for monitoring welding deformation of welded structures, characterized by having a displacement sensor that measures a displacement on the surface of a welded structure; a deformation amount calculation device that calculates an amount of deformation of the welded structure based on data from the displacement sensor and positional information of displacement measurement points; a thermometer that measures a surface temperature of the welded structure; a temperature distribution calculation device that estimates a temperature distribution of the welded structure based on data from the thermometer and positional information of temperature measurement points; and an evaluation device that evaluates welding deformation of the welded structure during the welding. The evaluation device includes a first computing unit that estimates thermal deformation amount caused by linear expansion of the welded structure from the temperature distribution of the welded structure obtained by the temperature distribution calculation device; a second computing unit that computes a true amount of welding deformation by subtracting the estimated thermal deformation amount obtained by the first computing unit from the amount of deformation of the welded structure obtained by the deformation amount calculation device; a database that has tolerance values of welding deformation amount stored therein in advance for each welding process; and a determination unit that determines whether or not the welding deformation is permissible by comparing the true amount of welding deformation determined by the second computing unit and the tolerance value of the welding deformation amount. This method can determine a true amount of welding deformation in the weld portion caused by elastic and plastic deformation by subtracting thermal deformation amount caused by linear expansion resulting from a temperature distribution from the deformation amount that can be directly observed by measurement, and thus allows monitoring of deformation during a welding process.

RELATED ART DOCUMENTS

Patent Documents

Patent Document 1: JP 2000-39308A
Patent Document 2: JP 2010-131629A

SUMMARY OF INVENTION

Problems to be Solved by the Invention

However, with the technique disclosed in Patent Document 1, since it measures changes with time in the dynamic strain amount, it requires a certain period of time before the judgment of whether or not cracking has occurred. To measure the weld portion in a short period of time, the measurement area would have to be divided into a plurality of sections to be irradiated with laser beams at the same time. This will raise the inspection cost, as laser emission devices are expensive, and therefore such a system can hardly be introduced into an actual production line.

The technique disclosed in Patent Document 2, which determines a true amount of welding deformation caused by elastic and plastic deformation in the weld portion by subtracting thermal deformation amount caused by linear expansion resulting from a temperature distribution, is suitable for monitoring large structures where thermal deformation is large due to uneven distribution of temperature. This is, however, hardly applicable for small components such as those forming a vehicle power transmission device. The measurement method requires a plurality of thermometers other than the displacement sensor and can hardly be performed simply.

Vehicle power transmission devices are also subjected to vibration and the like transmitted from the power source or wheels. Cracks present in the weld portion between the case and the ring gear can lower the fatigue strength. Therefore, a method that enables 100% inspection needs to be developed.

The present invention was made in view of the circumstances described above and has an object to provide a method and an apparatus for manufacturing a vehicle power transmission device including a case and a ring gear fitted on an outer peripheral surface of the case to transmit drive power from a power source, whereby easy and reliable in-line 100% inspection of a lapping portion of a weld bead between the case and the ring gear is made possible.

Means of Solving the Problems (1) To achieve the above purpose, one aspect of the invention provides a method for manufacturing a vehicle power transmission device including a case and a ring gear fitted on an outer peripheral surface of the case to transmit drive power from a drive source, the method including: a welding step in which an annular flange is formed to either one of the case and the ring gear, and along an abutting portion between one side surface of the annular flange and the case or the ring gear, butt-welding is performed such that ends of a weld bead are lapped; a measurement step of measuring an outline of the other side surface of the annular flange placed in close proximity to the one side surface; and an evaluation step of evaluating a weld condition based on part of the outline, which is measured in the measurement step, of a portion corresponding to a lapping portion of the weld bead, wherein the one side surface in which the weld bead is formed in the welding step and the other side surface of which the outline is measured in the measurement step are opposite side surfaces being in close proximity to each other and at a distance of a thickness of the annular flange.

(2) To achieve the above purpose, another aspect of the invention provides a method for manufacturing a vehicle power transmission device including a case and a ring gear fitted on an outer peripheral surface of the case to transmit drive power from a drive source, the method including: a welding step in which an annular flange is formed to either one of the case and the ring gear, and along an abutting portion between one side surface of the annular flange and the case or the ring gear, butt-welding is performed such that ends of a weld bead are lapped; a measurement step of measuring an outline of the other side surface of the annular flange placed in close proximity to the one side surface; and an evaluation step of evaluating a weld condition based on part of the outline, which is measured in the measurement step, of a portion corresponding to a lapping portion of the weld bead, wherein the welding step includes performing laser beam welding, and the evaluation step includes determining that no cracks have occurred in the weld bead if the outline measured in the measurement step is dented toward the weld bead in the portion corresponding to the lapping portion as compared to a non-lapping portion.

(3) In the method for manufacturing a vehicle power transmission device described in (1) or (2), preferably, the annular flange is provided to stand on the outer peripheral surface of the case.

(4) In the method for manufacturing a vehicle power transmission device described in (1) or (2), preferably, the annular flange is provided to extend from a body of the ring gear along the outer peripheral surface of the case.

(5) In the method for manufacturing a vehicle power transmission device described in (3) or (4), preferably, the case is a differential case or a transfer case.

(6) To achieve the above purpose, another aspect of the invention provides an apparatus for manufacturing a vehicle power transmission device including a case and a ring gear fitted on an outer peripheral surface of the case to transmit drive power from a power source, the apparatus including: a welding device configured to perform butt-welding along an abutting portion between one side surface of an annular flange provided to either one of the case and the ring gear and the case or the ring gear so that ends of a weld bead are lapped; a measurement device to measure an outline of the other side surface of the annular flange placed in close proximity to the one side surface; and an evaluation device to evaluate a weld condition based on part of the outline, which is measured in the measurement device, of a portion corresponding to a lapping portion of the weld bead, the one side surface in which the weld bead is formed with the welding device and the other side surface of which the outline is measured with the measurement device are opposite side surfaces being in close proximity to each other and at a distance of a thickness of the annular flange.

(7) To achieve the above purpose, another aspect of the invention provides an apparatus for manufacturing a vehicle power transmission device including a case and a ring gear fitted on an outer peripheral surface of the case to transmit drive power from a power source, the apparatus including: a welding device configured to perform butt-welding along an abutting portion between one side surface of an annular flange provided to either one of the case and the ring gear and the case or the ring gear so that ends of a weld bead are lapped; a measurement device to measure an outline of the other side surface of the annular flange placed in close proximity to the one side surface; and an evaluation device to evaluate a weld condition based on part of the outline, which is measured with the measurement device, of a portion corresponding to a lapping portion of the weld bead, wherein the welding device performs laser beam welding, and the evaluation device includes determining that no cracks have occurred in the weld bead if the outline measured with the measurement device is dented toward the weld bead in the portion corresponding to a lapping portion as compared to a non-lapping portion.

Advantageous Effect of Invention

The manufacturing method of a vehicle power transmission device according to the present invention having the above configurations provides the following operations and advantageous effects. According to the configuration described in (1), the method includes a welding step in which an annular flange is formed to either one of the case and the ring gear, and along an abutting portion between one side surface of the annular flange and the case or the ring gear, butt-welding is performed such that ends of the weld bead are lapped; a measurement step of measuring an outline of the other side surface of the annular flange placed in close proximity to the one side surface; and an evaluation step of evaluating a weld condition based on part of the outline, which is measured in the measurement device, of a portion corresponding to a lapping portion of the weld bead, wherein the one side surface in which the weld bead is formed in the welding step and the other side surface of which the outline is measured in the measurement step are opposite side surfaces being in close proximity to each other and at a distance of a thickness of the annular flange. Thus, 100% inspection can be performed easily and reliably of the weld condition of the lapping portion of the weld bead where weld defects tend to occur.

In the abutting or contact portion between one side surface of the annular flange and the case or the ring gear that are butt-welded together, tensile stress is generated by contraction when the molten metal solidifies. This tensile stress pulls the other side surface in close proximity to one side surface of the annular flange toward the abutting portion. As a result, the outline or outer shape of the other side surface of the annular flange undergoes deformation. The tensile stress is larger, in particular, in the lapping portion of the weld bead than in other non-lapping portions because of repeated heat application. The amount of deformation in the outline of the other side surface of the annular flange is accordingly larger than in other non-lapping portions.

Meanwhile, the coarse grain region near the fusion line in the heat-affected zone (hereinafter, "HAZ") that is affected by the heat during welding generally tends to be hard and has a low fracture ductility. In the lapping portion of the weld bead with low ductility, in particular, as the tensile stress caused by contraction is large, so-called HAZ cracking can easily occur. As HAZ cracks propagate along the weld bead, the outline of the other side surface of the annular flange in close proximity to one side surface does not undergo deformation when HAZ cracking has occurred. This is because the HAZ cracks interrupt the path of the tensile stress caused by contraction so that the stress is not transmitted to the other side surface.

Based on the above, it is possible to determine that there are no cracks in the weld, in particular in the HAZ, if the outline of the other side surface of the annular flange is deformed, and that there are cracks in the weld, in particular in the HAZ, if the outline of the other side surface of the annular flange is not deformed. It is then only necessary to measure the outline of the other side surface that is not welded for this evaluation, and there is no need to directly measure the outer shape of the weld portion which takes a complex wavy form as in the invention of Patent Document 1. Therefore, the measurement can be done easily and quickly with the use of a commonly known shape measurement device such as, for example, an inductive displacement sensor.

Presence or absence of cracks in the weld, in particular in the HAZ, can readily be determined without directly observing the weld portion but by observing the other side surface of the annular flange for a change in its outline in the lapping portion of the weld bead. Namely, this feature makes use of the phenomenon that occurs when there are cracks in the weld, whereby it is made possible to inspect easily and quickly for cracks that are hard to find through direct observation.

Inspection of the length of the lapping portion of the weld bead, whether it is too long or too short relative to a preset value, can also be performed easily based on the outline of the portion corresponding to the lapping portion of the weld bead, which is determined by the measurement. Namely, the length of the lapping portion of the weld bead is proportional to the length of a range of deformation in the welding direction (advancing direction) in the outline of the other side surface of the annular flange, and the outline of the other side surface will be stepped at the interface between the portion corresponding to the lapping portion and non-lapping portions. Therefore, the length of the lapping portion may be inspected easily by determining the distance between the steps (difference in size) in the welding direction (advancing direction) and comparing it with a preset value.

As described above specifically, the weld condition can be inspected by measuring the outline of the other side surface in close proximity to one side surface of the annular flange and based on part of the outline, which is determined by the measurement, of the portion corresponding to the lapping portion of the weld bead.

Accordingly, this feature provides a manufacturing method of a vehicle power transmission device having a case and a ring gear that is fitted on an outer peripheral surface of the case and transmits drive power from a power source, whereby easy and reliable in-line 100% inspection of a lapping portion of a weld bead between the case and the ring gear is made possible.

According to the configuration described in (2), in the manufacturing method of a vehicle power transmission device including a case and a ring gear fitted on an outer peripheral surface of the case to transmit drive power from a drive source, the method includes: a welding step in which an annular flange is formed to either one of the case and the ring gear, and along an abutting portion between one side surface of the annular flange and the case or the ring gear, butt-welding is performed such that ends of a weld bead are lapped; a measurement step of measuring an outline of the other side surface of the annular flange placed in close proximity to the one side surface; and an evaluation step of evaluating a weld condition based on part of the outline, which is measured in the measurement step, of a portion corresponding to a lapping portion of the weld bead, the welding step includes performing laser beam welding, and the evaluation step includes determining that no cracks have occurred in the weld bead if the outline measured in the measurement step is dented toward the weld bead in the portion corresponding to the lapping portion as compared to a non-lapping portion. Thus the lapping portion of the weld bead can be inspected for cracks easily and reliably.

Namely, the welding step is achieved by laser beam welding. Accordingly, a ratio of penetration width to penetration depth of the weld bead is small. Even when the annular flange may have a small thickness, the weld bead does not extend as far as to the other side surface in close proximity to its one side surface. As the other side surface does not melt and remains the same despite the small thickness of the annular flange, its outline can be measured easily. With a smaller thickness of the annular flange, the other side surface is more readily affected by the tensile stress caused by contraction so that its outline will be deformed more largely, showing a clearer difference between the portion corresponding to the lapping portion and other portions.

Thus, if the outline of the portion corresponding to the lapping portion of the weld bead, which is determined by the measurement, is dented toward the weld bead as compared to the non-lapping portions, it is possible to suppose that the other side surface has been pulled due to the tensile stress caused by contraction, and it can be determined correctly that there are no cracks in the weld, in particular in the HAZ.

Evaluation is therefore performed more easily and reliably, as it is possible to quickly and correctly determine whether or not there are cracks in the weld, in particular in the HAZ, by checking whether or not the outline of the portion corresponding to the lapping portion of the weld bead is dented toward the weld bead as compared to the non-lapping portions. Thus, in-line 100% inspection can be performed more easily and reliably of a lapping portion of the weld bead between the case and the ring gear.

According to the configuration described in (3), in the manufacturing method of a vehicle power transmission device as set forth in (1) or (2), as the annular flange is provided to stand on the outer peripheral surface of the case, measurement can be carried out at the same time with the welding by rotating the case around its axis, with the welding device and the measurement device being set in fixed positions. Thus the weld condition can be inspected in a short period of time. In this way, in-line 100% inspection can be performed more easily and reliably of a lapping portion of the weld bead between the case and the ring gear.

According to the configuration described in (4), in the manufacturing method of a vehicle power transmission device as set forth in (1) or (2), as the annular flange is provided to extend from a body of the ring gear along the outer peripheral surface of the case, the fitted portion between the ring gear and the case can be directly welded together. As there is no need to provide an abutting portion between the case and the ring gear, the machining is made simpler. As the annular flange extends along the outer peripheral surface of the case, measurement can be carried out at the same time with the welding by rotating the case around its axis, with the welding device and the measurement device being set in fixed positions. Thus the weld condition can be inspected in a short period of time. In this way, while the cost of the machining method is reduced, in-line 100% inspection can be performed more easily and reliably of a lapping portion of the weld bead between the case and the ring gear.

According to the feature as set forth in (5), in the manufacturing method of a vehicle power transmission device as set forth in (3) or (4), as the case is a differential case or a transfer case, it can be securely attached to the ring gear by butt-welding to form a differential gear or a transfer gear box, which enables a reduction in the production cost, as compared to the conventional secure attachment structure with fastening bolts. In this way, while the production cost of the differential gear or transfer gear box is reduced, in-line 100% inspection can be performed more easily and reliably of a lapping portion of the weld bead between the case and the ring gear.

The apparatus for manufacturing a vehicle power transmission device according to the present invention having the above configurations provides the following operations and advantageous effects. According to the configuration described in (6), in an apparatus for manufacturing a vehicle power transmission device including a case and a ring gear fitted on an outer peripheral surface of the case to transmit drive power from a power source, the apparatus includes: a welding device configured to perform butt-welding along an abutting portion between one side surface of an annular flange provided to either one of the case and the ring gear and the case or the ring gear so that ends of the weld bead are lapped; a measurement device to measure an outline of the other side surface of the annular flange placed in close proximity to the one side surface; and an evaluation device to evaluate a weld condition based on part of the outline, which is measured in the measurement device, of a portion corresponding to a lapping portion of the weld bead, the one side surface in which the weld bead is formed with the welding device and the other side surface of which the outline is measured with the measurement device are opposite side surfaces being in close proximity to each other and at a distance of a thickness of the annular flange. Thus, 100% inspection can be performed easily and reliably of the weld condition of the lapping portion of the weld bead where weld defects tend to occur. In other words, for a vehicle power transmission device having a case and a ring gear that is fitted on the outer peripheral surface of the case and transmits drive power from a power source, in-line 100% inspection can be performed easily and reliably of a lapping portion of the weld bead between the case and the ring gear. Furthermore, according to the configuration described in (7), in an apparatus for manufacturing a vehicle power transmission device including a case and a ring gear fitted on an outer peripheral surface of the case to transmit drive power from a power source, the apparatus includes: a welding device configured to perform butt-welding along an abutting portion between one side surface of an annular flange provided to either one of the case and the ring gear and the case or the ring gear so that ends of a weld bead are lapped; a measurement device to measure an outline of the other side surface of the annular flange placed in close proximity to the one side surface; and an evaluation device to evaluate a weld condition based on part of the outline, which is measured with the measurement device, of a portion corresponding to a lapping portion of the weld bead, wherein the welding device performs laser beam welding, and the evaluation device includes determining that no cracks have occurred in the weld bead if the outline measured with the measurement device is dented toward the weld bead in the portion corresponding to the lapping portion as compared to a non-lapping portion. Accordingly, a ratio of penetration width to penetration depth of the weld bead is small. Even when the annular flange may have a small thickness, the weld bead does not extend as far as to the other side surface in close proximity to its one side surface. As the other side surface does not melt and remains the same despite the small thickness of the annular flange, its outline can be measured easily. With a smaller thickness of the annular flange, the other side surface is more readily affected by the tensile stress caused by contraction so that its outline will be deformed more largely, showing a clearer difference between the portion corresponding to the lapping portion and other portions. Thus, if the outline of the portion corresponding to the lapping portion of the weld bead, which is determined by the measurement, is dented toward the weld bead as compared to the non-lapping portions, it is possible to suppose that the other side surface has been pulled due to the tensile stress caused by contraction, and it can be determined correctly that there are no cracks in the weld, in particular in the HAZ.

BRIEF DESCRIPTION OF THE DRAWINGS

FIG. 7 shows diagrams to explain good and bad welds depending on the length of the lapping portion of the weld bead;

MODE FOR CARRYING OUT THE INVENTION

Next, an embodiment of a method and an apparatus for manufacturing a vehicle power transmission device according to the present invention will be described with reference to the accompanying drawings. The manufacturing method in this embodiment includes a welding step in which an annular flange is provided to stand on the outer peripheral surface of a differential case, and along an abutting portion between one side surface of the annular flange and a ring gear, butt-welding is performed such that ends of a weld bead are lapped; a measurement step of measuring an outline of the other side surface of the annular flange that is in close proximity to its one side surface, and an evaluation step of evaluating a weld condition based on part of the outline, which is measured in the measurement step, of a portion corresponding to the lapping portion of the weld bead. The structure of the abutting portion between the differential case and the ring gear will be described first, after which the welding step, measurement step, and evaluation step will be described in detail in this order.

<Structure of Abutting Portion>

Figure 1:
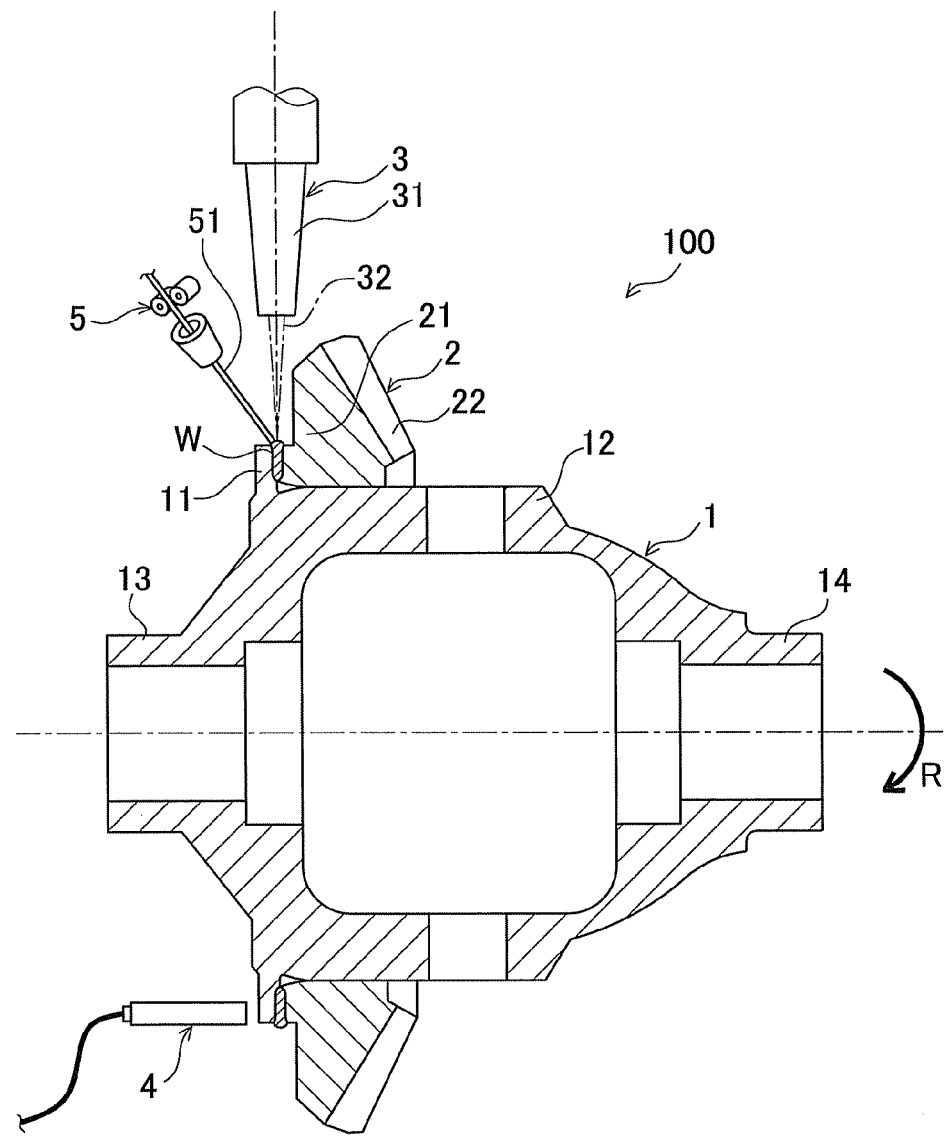
FIG. 1 is a cross-sectional view showing a welding device for welding an abutting portion between an annular flange of a differential case and a ring gear, and a measurement device for measuring an outline of the annular flange.
Figure 2:
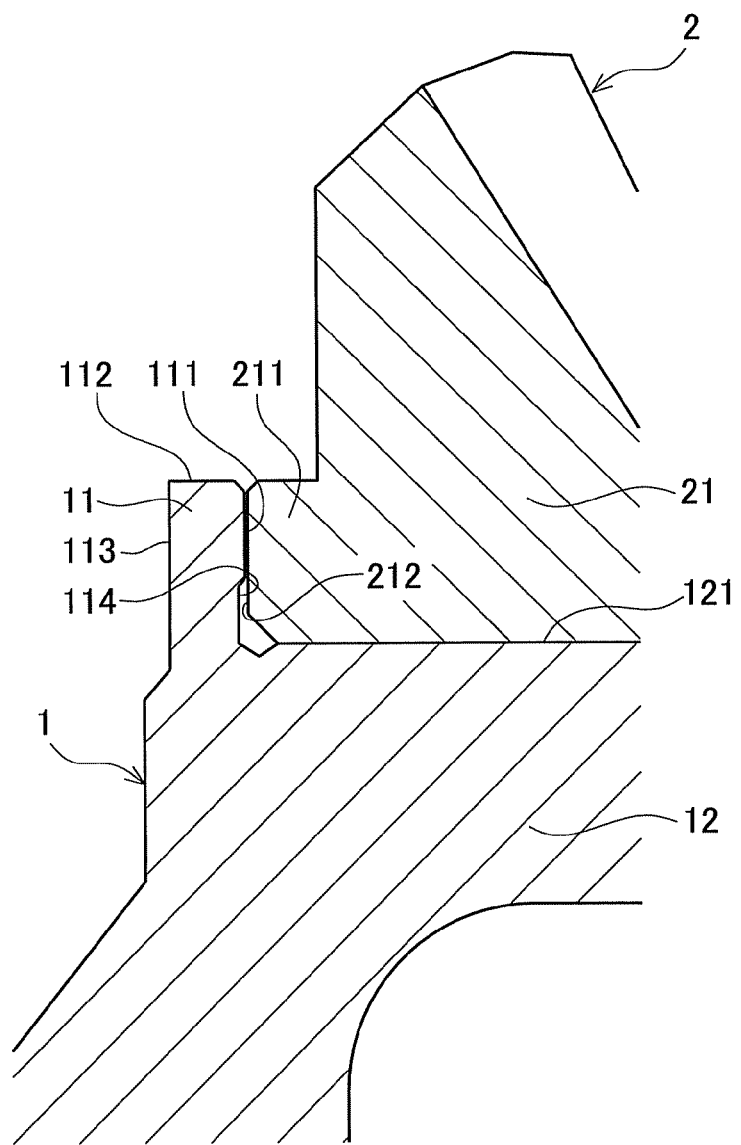
FIG. 2 is a cross-sectional view of the abutting portion between the annular flange and the ring gear.

First, the structure of the abutting or contact portion between the differential case and the ring gear will be described. FIG. 1 shows a laser welding device 3 for welding an abutting portion between an annular flange 11 of a differential case 1 and a ring gear 2, and a measurement device 4 for measuring an outline or outer shape of the annular flange 11. FIG. 2 shows a cross-sectional view of the abutting portion between the annular flange 11 and the ring gear 2.

As shown in FIG. 1, the differential gear 100 includes the differential case 1, and the ring gear 2 securely attached to the annular flange 11 standing on an outer peripheral surface of the differential case 1. The differential case 1 is made of spherical graphite cast iron, and has a hollow housing part 12 in the center for encasing a drive gear and pinion gears (not shown), and cylindrical support parts 13 and 14 formed at left and right ends of the hollow housing part 12 for supporting a drive shaft (not shown) that is connected to the drive gear for drive wheels. The ring gear 2 includes a ring-like body 21 and teeth 22 formed on the outer periphery of the body 21. The body 21 of the ring gear 2 is fitted on the outer peripheral surface of the hollow housing part 12 of the differential case 1. The ring gear 2 is made of chromium molybdenum steel.

As shown in FIG. 2, the annular flange 11 having a predetermined thickness stands upright on the outer peripheral surface 121 of the hollow housing part 12 of the differential case 1. The annular flange 11 has a thickness of about 3 to 5 mm so that one side surface 111 and the other side surface 113 are close to each other. A flange 211 having the same height as that of the annular flange 11 of the differential case 1 is formed on the body 21 of the ring gear 2. Therefore, the upper end 112 of the annular flange 11 is coplanar with the upper end of the flange 211 of the ring gear 2. One surface 111 of the annular flange 11 abuts on one side 212 of the flange 211 of the ring gear 2 to form an annular abutting portion. The abutting portion has a length in the radial direction that is about the same as the welding depth to be described later. An escape area 114 is formed in the annular flange 11 (in the heat-affected zone) on the radially inner side of the abutting portion. Providing the escape area 114 is supposed to minimize the gap in the abutting portion and to provide the effect of letting gas escape during welding.

<Welding Step>

Figure 3A:
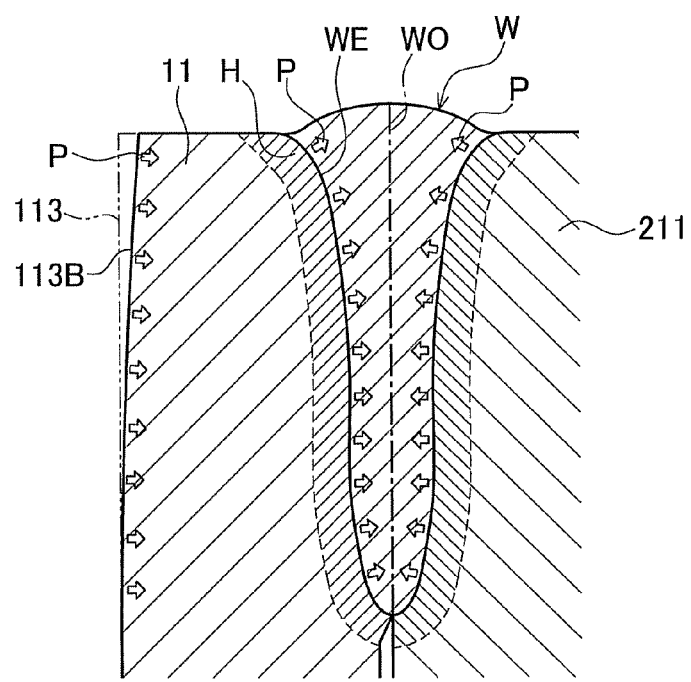
FIG. 3A is an enlarged cross-sectional view of a weld bead formed along the abutting portion in FIG. 2, where weld cracking has not occurred.
Figure 3B:
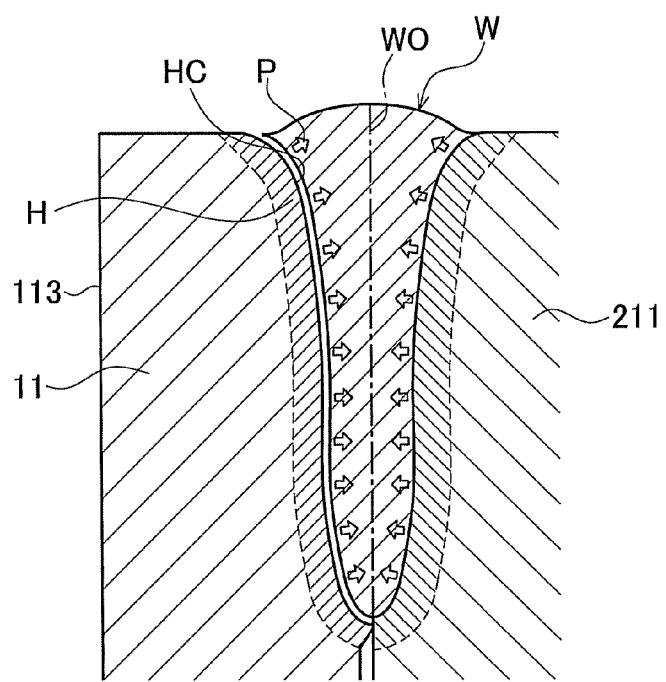
FIG. 3B is an enlarged cross-sectional view of a weld bead formed along the abutting portion in FIG. 2, where weld cracking (HAZ cracking) has occurred.

Next, the welding step of performing butt-welding along the abutting portion will be described. FIG. 3A and FIG. 3B are enlarged cross-sectional views of a lapping portion of a weld bead W formed along the abutting portion of FIG. 2, FIG. 3A showing a case where weld cracking has not occurred and FIG. 3B showing a case where weld cracking (HAZ cracking) has occurred.

As shown in FIG. 1, the laser welding device 3 is disposed above the abutting portion between the annular flange 11 and the ring gear body 21. The laser used in the welding device 3 may be, for example, a carbon dioxide gas laser, YAG (Yttrium Aluminum Garnet) laser, or fiber laser. The laser welding device 3 has a torch 31 retained in position by a retainer (not shown). Thus, the differential case 1 and the ring gear 2 rotate in a direction indicated by an arrow R, with the support parts 13 and 14 of the differential case 1 being held by rotating jigs (not shown). As soon as a laser beam 32 is emitted, the abutting portion between the annular flange 11 and the ring gear body 21 starts to melt, and when the differential case 1 and the ring gear 2 are rotated by one turn, the laser beam 32 emission is stopped. Emission is controlled such that the start and finish ends of the weld bead W overlap each other over a certain length. Output and the like of the laser beam 32 are controlled for this purpose. Filler metal 51 is supplied to the upper end face of the abutting portion by a filler supply device 5 from diagonally above to prevent formation of a sink mark in the weld portion. The filler metal 51 is usually a stainless-based metal and may be suitably selected depending on the materials of the differential case 1 and the ring gear 2.

As laser beam welding is a welding method with high energy density wherein coherent light is focused to a high density, the ratio of penetration width to depth of the weld bead W is small, as shown in FIG. 3A. For example, the penetration depth of the weld bead can be about 6 mm, and the penetration width can be about 1.5 to 2 mm. Therefore, although the annular flange 11 has a thickness as small as about 5 to 10 mm, the weld bead W does not reach the other, non-welded surface 113. As the weld bead W does not reach the other side surface 113, the surface remains flat.

The metal molten by the laser beam 32 instantly solidifies from a base material interface WE toward the weld bead center WO after the laser beam 32 has passed. Contraction at this time produces residual tensile stress P. This tensile stress P pulls the other side surface 113 of the annular flange 11 toward the weld bead. The tensile stress P is larger in the lapping portion of the weld bead W than in other parts as it has been irradiated with the laser beam 32 twice and subjected to repeated heat application. The pulled amount is accordingly larger, so that there is a step between a portion of the other side surface 113B of the annular flange 11 corresponding to the lapping portion of the weld bead W and other portions of the other side surface 113 of the annular flange 11 corresponding to non-lapping portions.

There is a heat-affected zone H formed at the interface of the weld bead W and the base material, as shown in FIG. 3A and FIG. 3B. The crystal grain size of the metal is increased by the weld heat input and the coarse grain region near the fusion line with the molten metal in the heat-affected zone H generally tends to be hard and has low fracture ductility. In the lapping portion of the weld bead W with low ductility, in particular, as the tensile stress P caused by contraction is large, so-called HAZ cracking can easily occur.

A HAZ crack starts to form from the upper end of the weld bead W, and grows downward along the heat-affected zone H, as shown in FIG. 3B. The HAZ crack develops along the advancing direction of the weld bead W. The HAZ crack interface HC is formed as a mild curve extending along the weld bead W and downward. This HAZ crack interface HC interrupts the path of the tensile stress P caused by contraction. Therefore, when HAZ cracking occurs, the other side surface 113 in close proximity to one side surface 111 of the annular flange 11 is not subjected to the tensile force P caused by contraction. As a result, the outline of the other side surface 113 of the annular flange 11 does not change.

<Measurement Step>

Figure 4A:
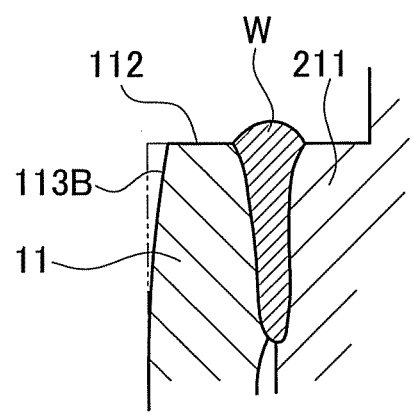
FIG. 4A is a schematic enlarged view of the weld portion in FIG. 2, showing a cross section of a weld bead.
Figure 4B:
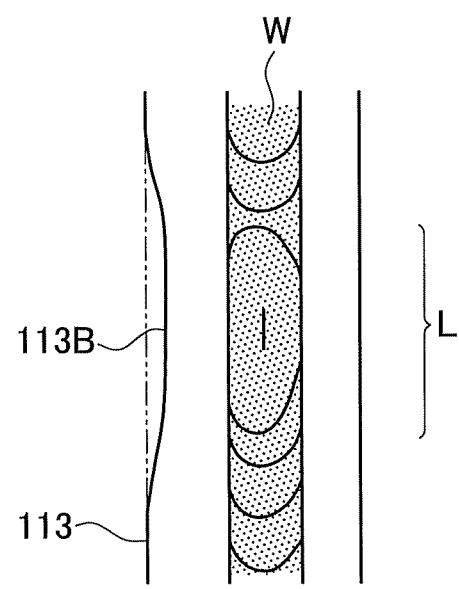
FIG. 4B is a schematic enlarged view of the weld portion in FIG. 2, showing a top plan view of a lapping portion of the weld bead.
Figure 5A:
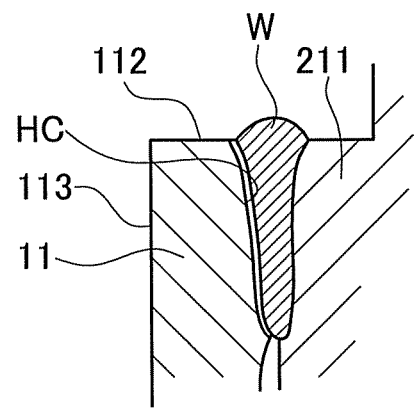
FIG. 5A is a schematic enlarged view of the weld portion in FIG. 2, where HAZ cracking has occurred, showing a cross section of the weld bead.
Figure 5B:
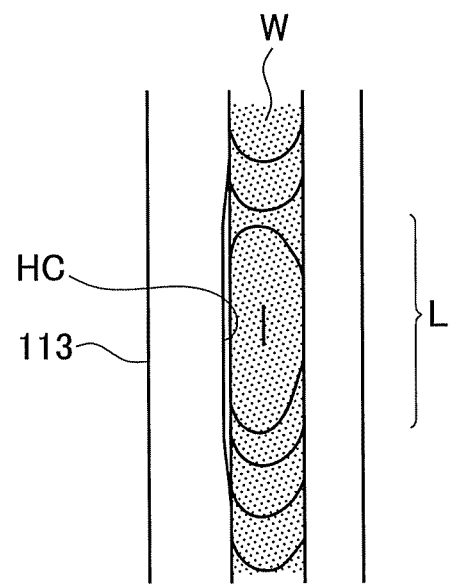
FIG. 5B is a schematic enlarged view of the weld portion in FIG. 2, where HAZ cracking has occurred, showing a top plan view of the lapping portion of the weld bead.

Next, the measurement step of measuring the outline of the other side surface 113 of the annular flange 11 will be described. FIG. 4A and FIG. 4B are schematic enlarged views of the weld portion in FIG. 2, FIG. 4A showing a cross-sectional view of the weld bead W, and FIG. 4B showing a top plan view of a lapping portion L of the weld bead W. FIG. 5A and FIG. 5B are schematic enlarged views of the weld portion in FIG. 2 where HAZ cracking has occurred, FIG. 5A showing a cross-sectional view of the weld bead W and FIG. 5B showing a top plan view of a lapping portion L of the weld bead W.

The measurement device 4 is disposed at the axially symmetric position of the laser welding device 3, as shown in FIG. 1. The measurement device 4 measures the outline of the other side surface 113 of the annular flange 11 after the welding by the laser welding device 3. For the measurement device 4, either of a non-contact type such as, for example, an inductive displacement sensor, or a contact type such as a dial gauge may be employed. In this embodiment, an inductive displacement sensor is installed, as it is compact and provides more precise measurements. The sensor head of the inductive displacement sensor is arranged parallel to the other side surface 113 of the annular flange 11. The sensor head is disposed in close proximity to the upper end side of the annular flange 11. This is because the deformation in the outline of the other side surface 113 of the annular flange 11 is larger on the side closer to the upper end 112, as shown in FIG. 4A.

Without any HAZ cracking, the other side surface 113 of the annular flange 11 has an outline dented toward the weld bead in the portion 113B corresponding to the lapping portion L of the weld bead W, as compared to other non-lapping portions 113, as shown in FIG. 4B. The measurement device 4 starts measurement at the same time with the start of the welding to obtain data of the non-lapping portions and lapping portion.

If cracking has occurred in the HAZ, there is no difference in the outline of the other side surface 113 of the annular flange 11 between the portion corresponding to the lapping portion L of the weld bead W and portions corresponding to non-lapping portions, as shown in FIG. 5A and FIG. 5B. Thus, whether cracking has occurred or not in the weld, in particular in the HAZ, is clearly distinguishable based on the outline of the other side surface 113 of the annular flange 11, whether it is dented toward the weld bead in the portion corresponding to the lapping portion L of the weld bead W as compared to the non-lapping portions.

<Evaluation Step>

Figure 6A:
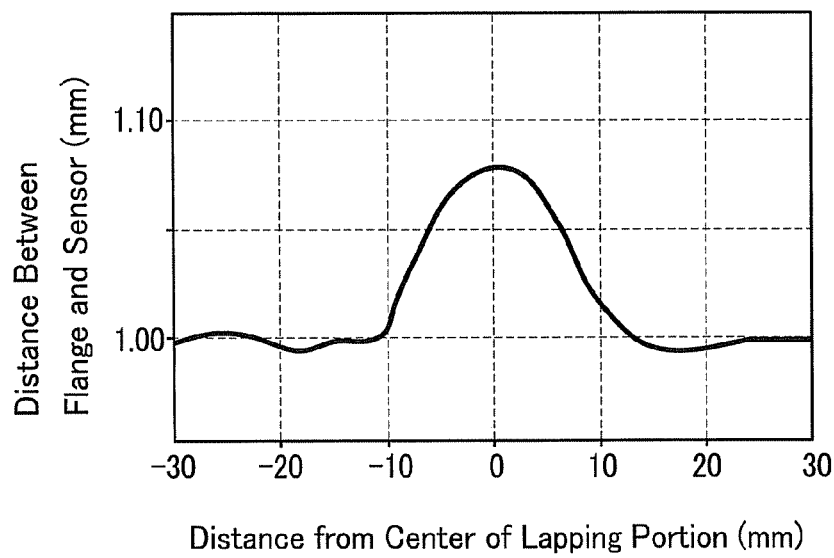
FIG. 6A is a graph of data obtained through measurement of the outline of the other side surface of the annular flange when no HAZ cracking has occurred in the lapping portion of the weld bead.
Figure 6B:
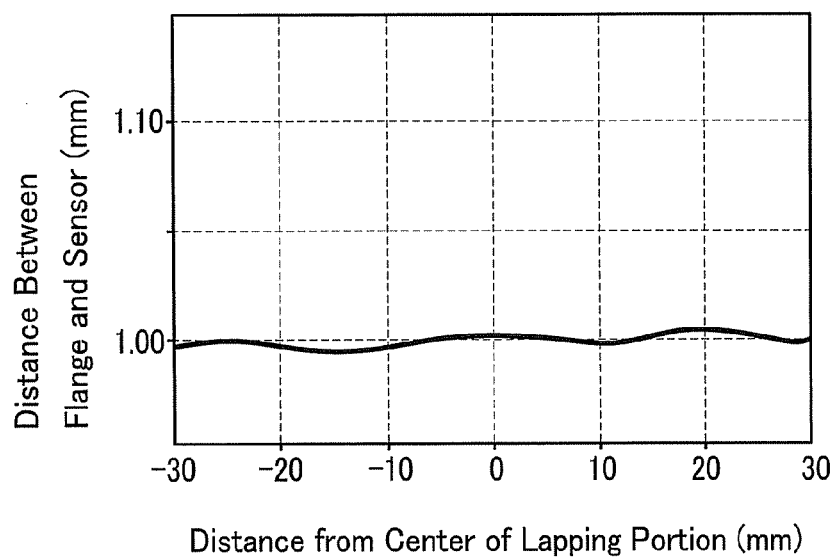
FIG. 6B is a graph of data obtained through measurement of the outline of the other side surface of the annular flange when HAZ cracking has occurred in the lapping portion of the weld bead.

Next, the evaluation step will be described. FIG. 6A and FIG. 6B are graphs of data obtained through measurement of the outline of the other side surface 113 of the annular flange 11, FIG. 6A showing the data when no HAZ cracking has occurred in the lapping portion L of the weld bead W, and FIG. 6B showing the data when HAZ cracking has occurred in the lapping portion L of the weld bead W. FIG. 7 shows diagrams to explain good and bad welds depending on the length of the lapping portion L of the weld bead W.

In FIG. 6A and FIG. 6B, the horizontal axis represents the distance from the center of the lapping portion of the weld bead W, while the vertical axis represents the distance between the other side surface 113 of the annular flange 11 and the sensor head. FIG. 6A shows that the outline of the other side surface 113 of the annular flange 11 is deformed in a range of about 20 mm around the center of the lapping portion such as to move away from the sensor head (toward the weld bead). It shows, in particular, that the outline is dented to a depth of about 50 to 70 µm in the range of about 10 mm around the center of the lapping portion. On the other hand, FIG. 6B shows that the outline of the other side surface 113 of the annular flange 11 has barely changed.

In this embodiment, the weld bead W is designed to have a lapping portion of about 10 mm. It can be seen that there has been a local difference in an amount of about 50 to 70 µm in the outline between the portion corresponding to the lapping portion L of the weld bead W and portions corresponding to the non-lapping portions of the weld bead W.

As shown in FIG. 7, the measurement of the outline of the other side surface 113 of the annular flange 11 allows for evaluation of the length of the lapping portion. More specifically, if there is no denting deformation, the weld bead W can be determined to be no good, as it means that the weld bead W has no lapping portion. If the amount of denting deformation indicates the length being substantially equal to the preset length of L1, the weld bead is determined to be good, as it has a lapping portion of an appropriate length. If the amount of denting deformation indicates a length L2 larger than the preset length, the weld bead is determined to be no good, as its lapping portion is too long.

As demonstrated above, in the evaluation step, the weld condition, including presence or absence of cracks in the weld, in particular in the HAZ and the length of the lapping portion, can be evaluated based on the outline of the portion corresponding to the lapping portion of the weld bead, which has been determined in the measurement step.

<Operations and Advantageous Effects>

As has been described above in detail, the manufacturing method of the vehicle power transmission device 100 according to this embodiment includes the welding step in which an annular flange 11 is provided to the differential case 1, and along the abutting portion between one side surface 111 of the annular flange 11 and the ring gear 2, butt-welding is performed such that ends of the weld bead W are lapped; the measurement step of measuring the outline of the other side surface 113 of the annular flange 11 that is in close proximity to its one side surface 111, and the evaluation step of evaluating the weld condition based on part of the outline, which is measured in the measurement step, of the portion 113 or 113B corresponding to the lapping portion L of the weld bead W. Thus, 100% inspection can be performed easily and reliably of the weld condition of the lapping portion L of the weld bead W where weld defects tend to occur.

Specifically, when along the abutting portion between one side surface 111 of the annular flange 11 and the ring gear 2, butt-welding is performed, tensile stress P is generated in the abutting portion by contraction when the molten metal solidifies. This tensile stress P pulls the other side surface 113 in close proximity to one side surface 111 of the annular flange 11 toward the abutting portion. As a result, the outline of the other side surface 113 of the annular flange 11 undergoes deformation. The tensile stress P is larger, in particular, in the lapping portion L of the weld bead than in other portions because of repeated heat application. The amount of deformation in the outline of the other side surface 113 of the annular flange 11 is accordingly larger in the lapping portion than in non-lapping portions.

Meanwhile, the coarse grain region near the fusion line in the heat-affected zone H that is affected by the heat during welding generally tends to be hard and has a low fracture ductility. In the lapping portion L of the weld bead W with low ductility, in particular, as the tensile stress P caused by contraction is large, so-called HAZ cracking can easily occur. As HAZ cracks propagate along the weld bead W, the outline of the other side surface 113 of the annular flange 11 in close proximity to one side surface 111 does not undergo deformation when HAZ cracking has occurred. This is because the HAZ cracks interrupt the path of the tensile stress P caused by contraction so that the stress is not transmitted to the other side surface 113.

Based on the above, it is possible to determine that there are no cracks in the weld, in particular in the HAZ, if the outline of the other side surface 113 of the annular flange 11 is locally deformed, and there are cracks in the weld, in particular in the HAZ, if the outline of the other side surface 113 of the annular flange 11 is not locally deformed. It is then only necessary to measure the outline of the other side surface 113 that is not welded for this evaluation, and there is no need to directly measure the outer shape of the weld which takes a complex wavy form as in the invention of Patent Document 1. Therefore, the measurement can be done easily and quickly with the use of a commonly known shape measurement device such as, for example, an inductive displacement sensor.

Presence or absence of cracks in the weld, in particular in the HAZ, can readily be determined without directly observing the weld portion but by observing the other side surface 113 of the annular flange 11 for a change in its outline in the lapping portion L of the weld bead W. Namely, the present invention makes use of the phenomenon that occurs when there are cracks in the weld, whereby it is made possible to inspect easily and quickly for cracks that are hard to find by direct observation.

Evaluation of the length of the lapping portion of the weld bead W, whether it is too long or too short relative to a preset value, can also be performed easily based on part of the outline, which is determined by the measurement, of the portion corresponding to the lapping portion L of the weld bead W. Namely, the lapping portion of the weld bead W has a length proportional to the length of a range of deformation in the welding direction (advancing direction) in the outline of the other side surface 113 of the annular flange 11, and the outline of the other side surface 113 will be stepped at the interface between the portion corresponding to the lapping portion L and non-lapping portions. Therefore, the length of the lapping portion may be inspected easily by determining the distance between the steps (difference in size) in the welding direction (advancing direction) and comparing it with a preset value.

As described above specifically, the weld condition can be inspected by measuring the outline of the other side surface 113 in close proximity to one side surface 111 of the annular flange 11 and based on the outline of the portion corresponding to the lapping portion L of the weld bead W, which has been determined by the measurement.

Accordingly, this embodiment provides a manufacturing method of a vehicle power transmission device 100 having a case 1 and a ring gear 2 that is fitted on an outer peripheral surface of the case 1 and transmits drive power from a power source, whereby in-line 100% inspection can be performed easily and reliably of a lapping portion of the weld bead W between the case 1 and the ring gear 2.

According to this embodiment, laser beam welding is performed in the welding step, and in the evaluation step, it is determined that there are no cracks in the weld, in particular in the HAZ, if the outline measured in the measurement step is locally dented toward the weld bead in the portion corresponding to the lapping portion L as compared to the non-lapping portion. Thus the lapping portion L of the weld bead W can be inspected easily and reliably for cracks, in particular, in the HAZ.

Namely, the welding step is achieved by laser beam welding that is known with a small ratio of penetration width to penetration depth of the weld bead W, so that, even though the annular flange 11 may have a small thickness, the weld bead W does not extend as far as to the other side surface 113 in close proximity to its one side surface 111. As the other side surface 113 does not melt and remains the same despite the small thickness of the annular flange 11, its outline can be measured easily. With a smaller thickness of the annular flange 11, the other side surface 113 is more readily affected by the tensile stress P caused by contraction so that its outline will be deformed more largely, showing a clearer difference between the portion corresponding to the lapping portion and other portions.

Thus, if the outline of the portion corresponding to the lapping portion L of the weld bead W, which is determined by the measurement, is locally dented toward the weld bead as compared to the non-lapping portions, it is possible to suppose that the other side surface 113 has been pulled due to the tensile stress P caused by contraction, and it can be determined correctly that there are no cracks in the weld, in particular in the HAZ.

Evaluation is therefore performed more easily and reliably, as it is possible to quickly and correctly determine whether or not there are cracks in the weld, in particular in the HAZ, only by checking whether or not the portion corresponding to the lapping portion L of the weld bead W is locally dented toward the weld bead as compared to the non-lapping portions. Thus, in-line 100% inspection can be performed more easily and reliably of a lapping portion of the weld bead W between the case 1 and the ring gear 2.

In this embodiment, as the annular flange 11 is provided to stand on the outer peripheral surface of the case 1, measurement can be carried out at the same time with the welding by rotating the case 1 around its axis, with the laser welding device 3 and the measurement device 4 being set in fixed positions. Thus the weld condition can be inspected in a short period of time. In this way, in-line 100% inspection can be performed more easily and reliably of a lapping portion of the weld bead W between the case 1 and the ring gear 2.

In this embodiment, as the case 1 is a differential case, it can be securely attached to the ring gear 2 by butt-welding to form the differential gear 100, which enables a reduction in the production cost, as compared to the conventional secure attachment structure with fastening bolts. In this way, while the production cost of the differential gear 100 is reduced, in-line 100% inspection can be performed more easily and reliably of a lapping portion of the weld bead W between the case 1 and the ring gear 2.

The apparatus for manufacturing a vehicle power transmission device 100 according to this embodiment provides the following advantageous effects. The apparatus for manufacturing the vehicle power transmission device 100 having a case 1 and a ring gear 2 that is fitted on an outer peripheral surface of the case 1 and transmits drive power from a power source according to this embodiment includes a laser welding device 3 used for performing butt-welding, wherein an annular flange 11 is provided to the case 1, and along the abutting portion between one side surface 111 of the annular flange 11 and the ring gear 2, butt-welding is performed such that ends of the weld bead W are lapped; a measurement device 4 for measuring an outline of the other side surface 113 of the annular flange 11 that is in close proximity to its one side surface 111; and an evaluation device for evaluating a weld condition based on part of the outline, which is measured in the measurement step, of a portion corresponding to the lapping portion L of the weld bead W. Thus, 100% inspection can be performed easily and reliably of the weld condition of the lapping portion L of the weld bead W where weld defects tend to occur. In other words, for a vehicle power transmission device 100 having a case 1 and a ring gear 2 that is fitted on the outer peripheral surface of the case 1 and transmits drive power from a power source, in-line 100% inspection can be performed easily and reliably of a lapping portion of the weld bead W between the case 1 and the ring gear 2.

The present invention is not limited to the above embodiment and may be embodied in other specific forms without departing from the essential characteristics thereof.

Figure 8A:
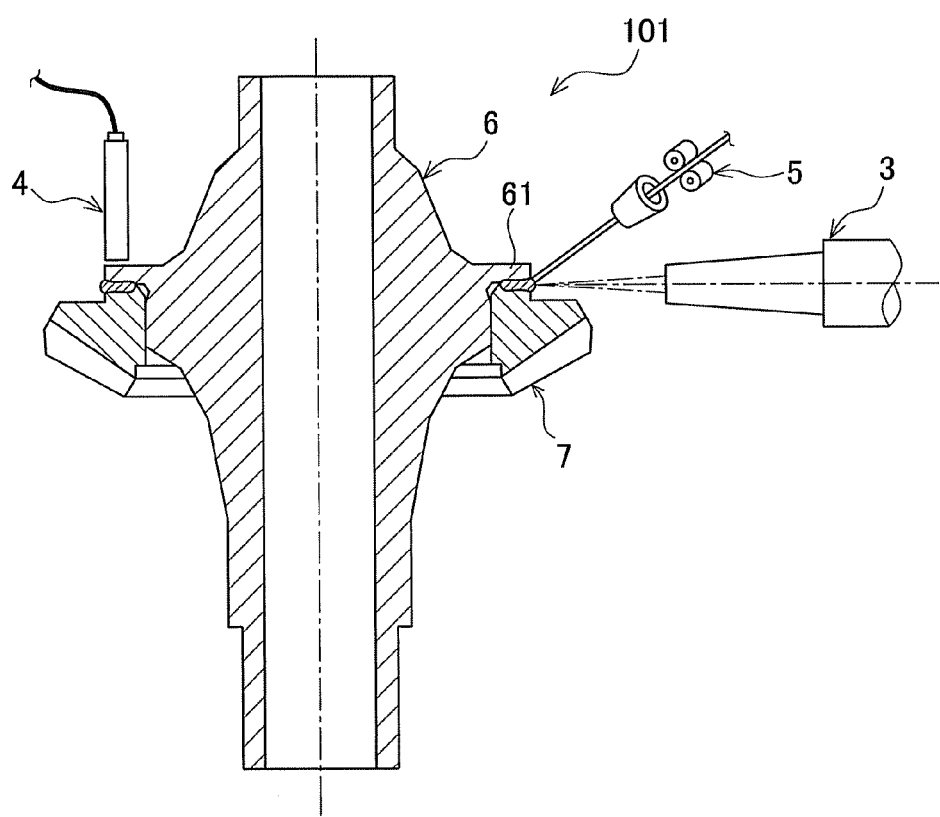
FIG. 8A is a cross-sectional view of a modified example of welding together a transfer case and a ring gear, wherein the ring gear is welded to an annular flange standing on the outer peripheral surface of the transfer case.
Figure 8B:
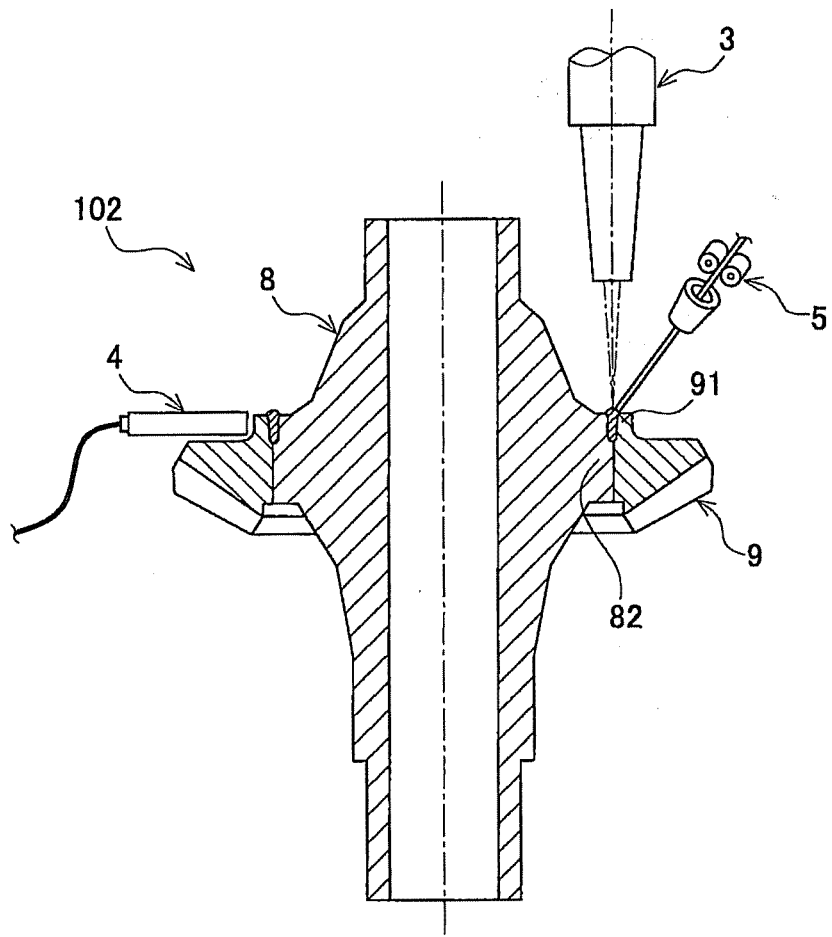
FIG. 8B is a cross-sectional view of a modified example of welding together a transfer case and a ring gear, wherein an annular flange extending from the ring gear body along the outer peripheral surface of the transfer case is welded to the transfer case.

(1) For instance, in the above embodiment, butt-welding is performed along the abutting portion between the annular flange 11 standing on the outer peripheral surface of the differential case 1 and the ring gear 2 as shown in FIG. 1. As an alternative, as shown in FIG. 8A, butt-welding may be performed along an abutting portion between an annular flange 61 standing on the outer peripheral surface of a transfer case 6 and a ring gear 7 in a transfer device 101. This is because any cylindrical case may be adopted. The case in the invention therefore includes a differential case, a transfer case, and others. As another alternative, as shown in FIG. 8B, an annular flange 91 extending from a main body of a ring gear 9 and an outer circumferential portion 82 of a transfer case 8 may also be butt-welded to each other along the outer periphery of the transfer case 8. Since a fit portion of the ring gear 9 can be directly welded to the transfer case 8, it is not necessary to additionally provide an abutting portion between the transfer case 8 and the ring gear 9, resulting in a simplified machining work. Needless to say, welding the annular flange extending from the transfer case (including the differential case) and the ring gear may be made along the outer periphery of the transfer case (including the differential case).

Figure 9:
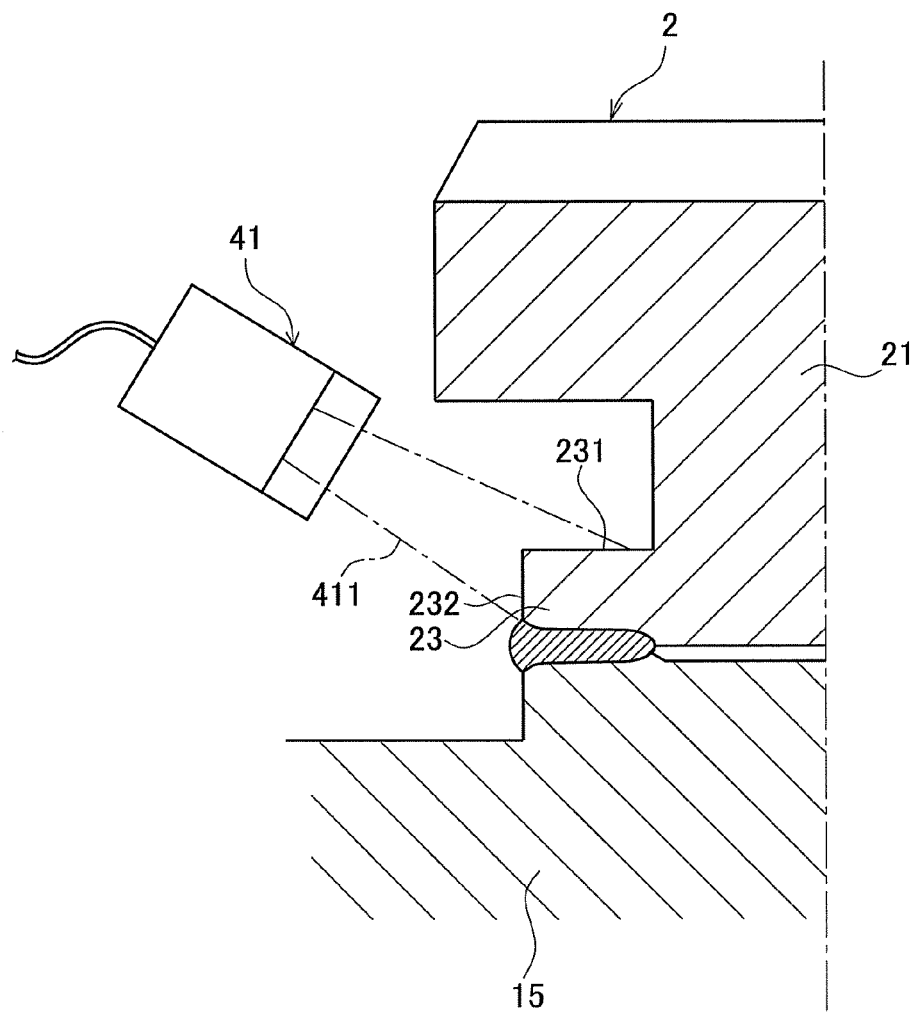
FIG. 9 shows a modified example of a measurement device used for a ring gear having a grooved structure.
Figure 10:
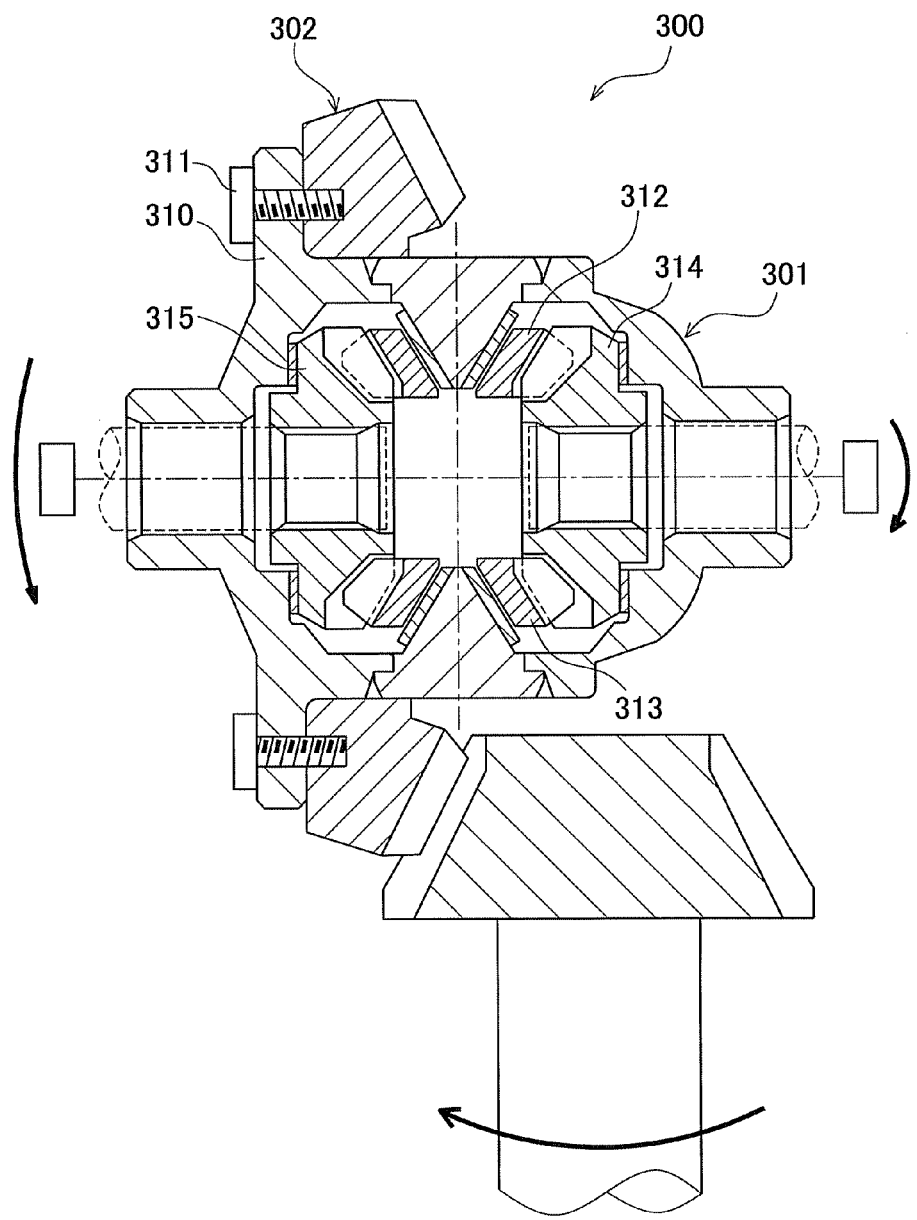
FIG. 10 is a cross-sectional view showing the structure of a conventional differential gear.

(2) In the above embodiment, for instance, the measuring device 4 is an inductive displacement sensor. However, two-dimensional laser displacement sensor 41 may also be used as shown in FIG. 9. In particular, it is effective in the case where an annular flange 23 of a ring gear 2 fitted on a case 15 is formed by groove-cutting a ring gear body 21. This is because measurement from above or obliquely above is enabled even when a measuring device cannot be placed in a groove. In this case, the outline of the other side surface 231 and the outline of an upper end 232 of the annular flange 23 can be simultaneously measured by a laser beam 411. This enables a deformation amount of the annular flange 23 to be ascertained more in detail. Thus, a weld condition can be inspected more accurately.

(3) In the above embodiment, for example, the laser welding device 3 is used for a welding device, but an electronic beam welding device may be used instead. This is because electronic beam welding is also a welding technique providing high energy density as with the laser beam welding.

INDUSTRIAL APPLICABILITY

The invention is utilizable for a manufacturing method and a manufacturing apparatus of a vehicle power transmission device such as a differential gear device, a transfer device, and others to be used in vehicles.

REFERENCE SIGNS LIST

1 Case, Differential case
2 Ring gear
3 Laser welding device
4 Measuring device
5 Filler supply device
6 Transfer case
7 Ring gear
8 Transfer case
9 Ring gear
11 Annular flange
12 Hollow housing part
21 Body of Ring gear
22 Teeth of Ring gear
31 Torch
32 Laser beam
51 Filler metal
100 Differential gear device
101 Transfer device
102 Transfer device
111 One side surface of Annular flange
112 Upper end of Annular flange
113 The other side surface of Annular flange
211 Flange of Ring gear
212 Side surface of Flange of Ring gear
H Heat-affected zone
P Tensile stress
L Lapping portion
W Weld bead
WE Base material interface
WO Weld bead center
HC HAZ crack interfaces

The invention claimed is:
1. A method for manufacturing a vehicle power transmission device including a case and a ring gear fitted on an outer peripheral surface of the case to transmit drive power from a drive source, the method including:
 a welding step in which an annular flange is formed to either one of the case and the ring gear, and along an abutting portion between one side surface of the annular flange and the case or the ring gear, butt-welding is performed such that start and stop points of a weld bead are lapped;

a measurement step of measuring an outline of a second side surface of the annular flange placed close to the one side surface; and an evaluation step of evaluating a weld condition based on part of the outline, which is measured in the measurement step, of a portion corresponding to a lapping portion of the weld bead, wherein the welding step includes performing laser beam welding, and the evaluation step includes determining that no cracks have occurred in the weld bead when the outline measured in the measurement step is dented toward the weld bead in the portion corresponding to the lapping portion as compared to a non-lapping portion.

2. The method for manufacturing a vehicle power transmission device according to claim 1, wherein the annular flange is provided to stand on the outer peripheral surface of the case.

3. The method for manufacturing a vehicle power transmission device according to claim 1, wherein the annular flange is provided to extend from a body of the ring gear along the outer peripheral surface of the case.

4. The method for manufacturing a vehicle power transmission device according to claim 2, wherein the case is a differential case or a transfer case.

5. The method for manufacturing a vehicle power transmission device according to claim 3, wherein the case is a differential case or a transfer case.

* * * * *